United States Patent [19]

Iwai

[11] E Patent Number: Re. 32,620

[45] Reissued Date of Patent: Mar. 8, 1988

[54] LUBRICATING SYSTEM FOR AN OUTBOARD ENGINE

[75] Inventor: Tomio Iwai, Hamamatsu, Japan

[73] Assignees: Sanshin Kogyo Kabushiki Kaisha; Yamaha Hatsudoki Kabushiki Kaisha, both of Japan

[21] Appl. No.: 774,661

[22] Filed: Sep. 11, 1985

Related U.S. Patent Documents

Reissue of:

[64] Patent No.: 4,493,661
Issued: Jan. 15, 1985
Appl. No.: 528,996
Filed: Sep. 2, 1983

U.S. Applications:

[63] Continuation of Ser. No. 281,418, Jul. 8, 1981, abandoned.

[30] Foreign Application Priority Data

Jul. 12, 1980 [JP] Japan ..... 55-95282

[51] Int. Cl.[4] ..... B63H 21/26

[52] U.S. Cl. ..... 440/77; 440/88; 123/195 P; 123/196 R; 123/196 W

[58] Field of Search ..... 440/76, 77, 88, 900; 123/73 AD, 65 R, 196 R, 196 CP, 195 C, 195 P, 198 E, 65 B, 70 R, 196 M, 196 W, 198 C; 180/205; 244/135 R

[56] References Cited

U.S. PATENT DOCUMENTS

| | | | |
|---|---|---|---|
| 1,252,360 | 1/1918 | Moore | 440/88 |
| 1,533,004 | 4/1925 | Henry | 123/196 R |
| 1,910,561 | 5/1933 | Pierce | 440/88 |
| 2,351,050 | 6/1944 | Karey | 440/88 |
| 2,549,483 | 4/1951 | Kiekhaefer | 123/195 P |
| 2,577,308 | 12/1951 | Carson | 123/198 E |
| 2,676,559 | 4/1954 | Davies | 440/77 |
| 2,780,331 | 2/1957 | Armstrong | 440/75 |
| 2,936,748 | 5/1960 | Jensen | 123/196 CP |
| 2,938,509 | 5/1960 | Carbonero | 123/73 AD |
| 2,983,334 | 5/1961 | Dalrymple | 123/196 CP |
| 3,114,356 | 12/1963 | Werner et al. | 123/73 AD |
| 3,137,285 | 6/1964 | Ausserbauer | 123/73 AD |
| 3,523,592 | 8/1970 | Fenton | 123/196 R |
| 3,570,465 | 3/1971 | Masaoka | 440/88 |
| 3,765,393 | 10/1973 | Pipes | 123/196 CP |
| 3,773,010 | 11/1973 | Elingsen | 440/77 |
| 4,031,877 | 6/1977 | Fujikawa et al. | 123/198 C |
| 4,262,710 | 4/1981 | Nomura et al. | 123/73 AD |
| 4,276,950 | 7/1981 | Vance | 180/205 |
| 4,512,292 | 4/1985 | Hundertmark | 123/70 R |

FOREIGN PATENT DOCUMENTS

| | | |
|---|---|---|
| 315008 | 5/1974 | Austria . |
| 12032 | 11/1972 | France . |

*Primary Examiner*—Joseph F. Peters, Jr.
*Assistant Examiner*—Stephen P. Avila
*Attorney, Agent, or Firm*—Ernest A. Beutler

[57] ABSTRACT

An improved lubricating system for a two-cycle outboard motor having a vertically extending crankshaft. The lubricating system employs a crankshaft driven pump and circulating system that permits pressure lubricating without necessitating elongation of the crankshaft or engine. The engine is enclosed within a cowling and an oil sump is conveniently located within the cowling and is accessible through a cover door of the cowling for replenishment of the oil supply without removal of the cowling.

30 Claims, 5 Drawing Figures

LUBRICATING SYSTEM FOR AN OUTBOARD ENGINE

Matter enclosed in heavy brackets [ ] appears in the original patent but forms no part of this reissue specification; matter printed in italics indicates the additions made by reissue.

This application is a continuation of application Ser. No. 281,418, filed July 8, 1981, now abandoned.

BACKGROUND OF THE INVENTION

This invention relates to an outboard engine and more particularly to an [improve] *improved* lubricating system for such an engine.

It has been proposed to eliminate the necessity of mixing lubricating oil with the fuel of two-cycle engines by providing a separate oil system which delivers oil to the engine for lubrication and eventual delivery with the fuel to the combustion chamber so that the residue will be burned. With such an arrangement it is, of course, necessary to provide an adequate supply of oil so as to insure that the engine can be operated for a fairly substantial period of time without necessitating [repllenishment] *replenishment* of the oil supply. The oil supply should, furthermore, be located in such a position so that it can be conveniently replenished.

Because of the compact construction of outboard motors, it has been difficult if not impossible to provide an adequate lubricant reservoir within the confines of the engine assembly itself. Although it has been proposed to provide a separate oil tank, this gives rise to the difficulty of insuring that oil flows from the tank to the engine under all times when the engine is running. This necessitates the provision of a separate pump and an arrangement to insure that the inlet to the pump will be immersed in lubricating oil during abrupt maneuvering of the associated boat.

It is, therefore, a principal object of this invention to provide an improved lubricating system for an outboard engine.

It is a further object of this invention to provide an outboard motor lubricating system embodying a separate oil reservoir.

It is yet a further object of this invention to provide a lubricating system for an outboard engine wherein a separate oil reservoir of sufficient capacity may be concealed within the cowling of the engine and yet conveniently filled.

DETAILED DESCRIPTION OF THE PREFERRED EMBODIMENT

Figure 1:
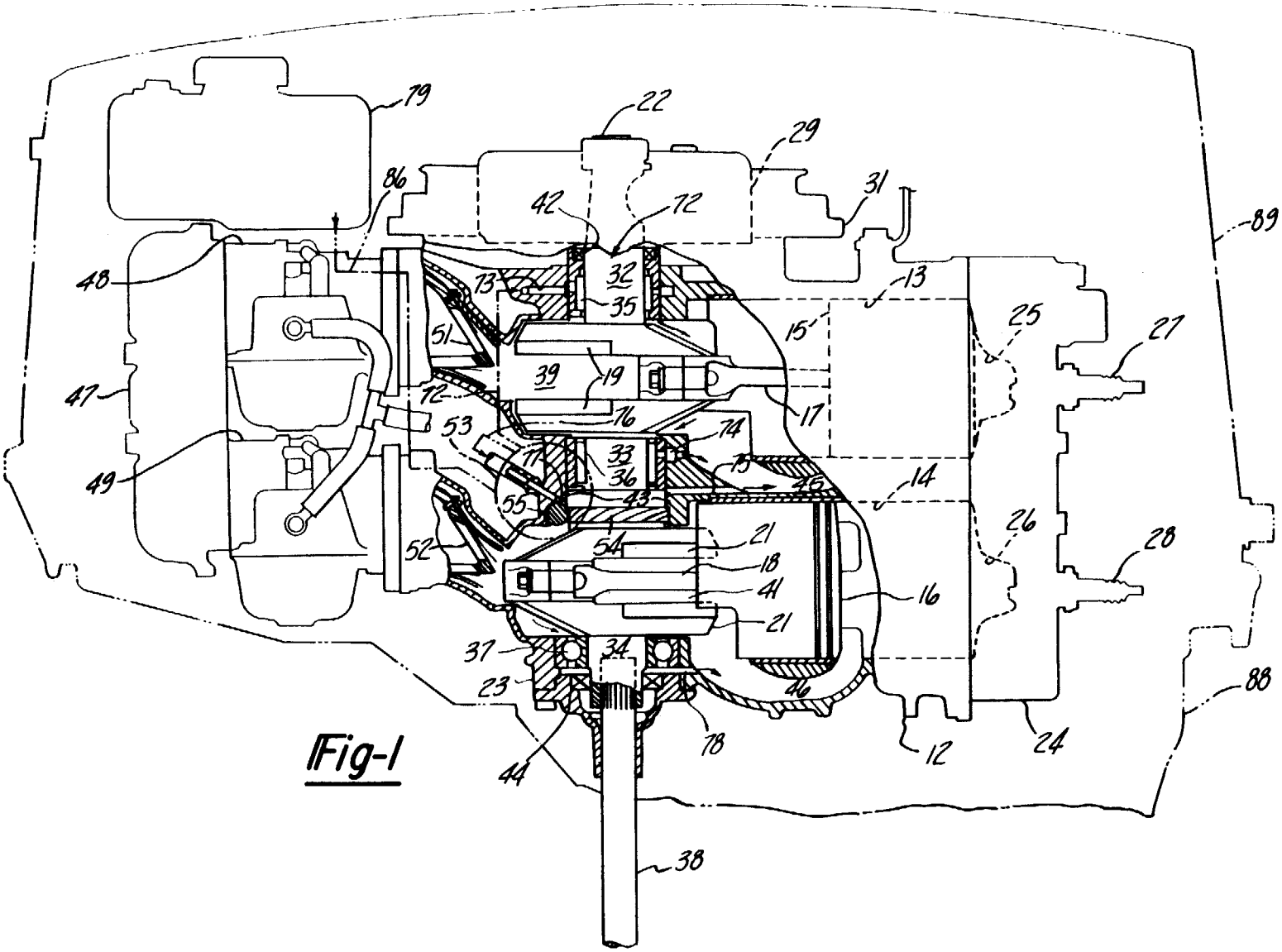
FIG. 1 is a side elevational view of the power head of an outboard engine constructed in accordance with this invention wherein the cowling is shown in phantom and portions of the engine have been broken away.

In the drawings an outboard motor constructed in accordance with this invention is identified generally by the reference numeral 11. Inasmuch as the invention relates to the lubricating system for the motor 11, only the power head has been illustrated and will be described in detail.

The engine includes a cylinder block 12 having a pair of horizontally extending vertically disposed [cyliner] *cylinder* bores 13 and 14. Pistons 15 and 16 are slideably supported within the [cyliner] *cylinder* bores 13 and 14, respectively. The pistons 15 and 16 are connected by means of respective connecting rods 17 and 18 to the throws 19 and 21 of a crankshaft, indicated generally by the reference numeral 22. The crankshaft 22 is supported for rotation about a vertically extending axis in a manner to be described by means of a crankcase 23 which is affixed to the cylinder block 12 in a known manner.

A cylinder head 24 is affixed to a cylinder block 12 and has chambers 25 and 26 that cooperate with the [cyliner] *cylinder* bores 13 and 14 and pistons 15 and 16 to form the combustion chambers for the engine. Spark plugs 27 and 28 are carried by the [cyliner] *cylinder* head 24 and cooperate with the chambers 26 and 27 for firing the charge in these chambers, as is well known.

The ignition system for the spark plugs 27 and 28 includes a flywheel magneto 29 that is affixed to the upper end of the crankshaft 22. A starter gear 31 is affixed to the flywheel magneto 29 and is adapted to be operated by an electric starter mechanism, [indicted] *indicated* generally at 30 (FIGS. 3 and 4) for starting of the engine.

The crankshaft 22 has 3 main [bearing] *bearings* consisting of an upper bearing portion 32, a center bearing portion 33, and a lower main bearing portion 34. The upper and middle main bearing portions 32 and 33 are supported by respective needle bearing assemblies 35 and 36, respectively. The lower crankshaft main bearing portion 34 is [suppoted] *supported* by a roller bearing assembly 37. Adjacent this roller bearing assembly 37, the crankshaft 22 is connected to a driveshaft 38 that extends downwardly through the driveshaft housing to the propeller drive (not shown).

The engine 11 is of the two-cycle crankcase compression type. For that purpose the crankcase 23 is divided into an upper crankcase chamber 39 which is associated with the cylinder bore 13, in a manner to be described, and a lower crankcase chamber portion 41, which is associated with the cylinder bore 14. An oil seal 42 serves the purpose of protecting the upper bearing 35 and also sealing the upper portion of the crankcase chamber 39. The crankcase chamber 39 is sealed from the crankcase chamber 41 by means of a labyrinth-type seal 43 which cooperates with the crankshaft 22 immediately below [it] *its* center main bearing portion 33. The lower crankcase chamber 41 is sealed by the means of the labyrinth seal 43 and an oil seal 44 which also serves to protect the bearing 37.

An induction system is provided for delivering a fuel air charge to the crankcase chambers 39 and 41 for eventual transfer from the respective crankcase portions to the combustion chambers 25 and 26 through respective transfer passages 45 and 46. The induction system includes an air inlet and silencer 47 which supplies filtered air to an upper carburetor 48 and a lower carburetor. The carburetors 48 and 49 discharge into the respective crankcase chambers 39 and 41 through reed valves 51 and 52 in a known manner. The portion of the engine thus far described is conventional and for that reason further details of the components and their operation has not been described.

It should be readily apparent to those skilled in the art that an intake charge is delivered from the carburetors 48 and 49 to the respective crankcase chambers 39 and 41 for transfer to the combustion chambers through the transfer passages 45 and 46 during the operation of the engine. Because the pistons 15 and 16 are 180 degrees out of phase with each other due to the offset of the crankshaft throws 19 and 21, the pressurization in the chambers 39 and 41 will also be out of phase with each other. The labyrinth seal 43 prevents any significant communication between the respective crankcase chambers 39 and 41, as has been described.

Figure 3:
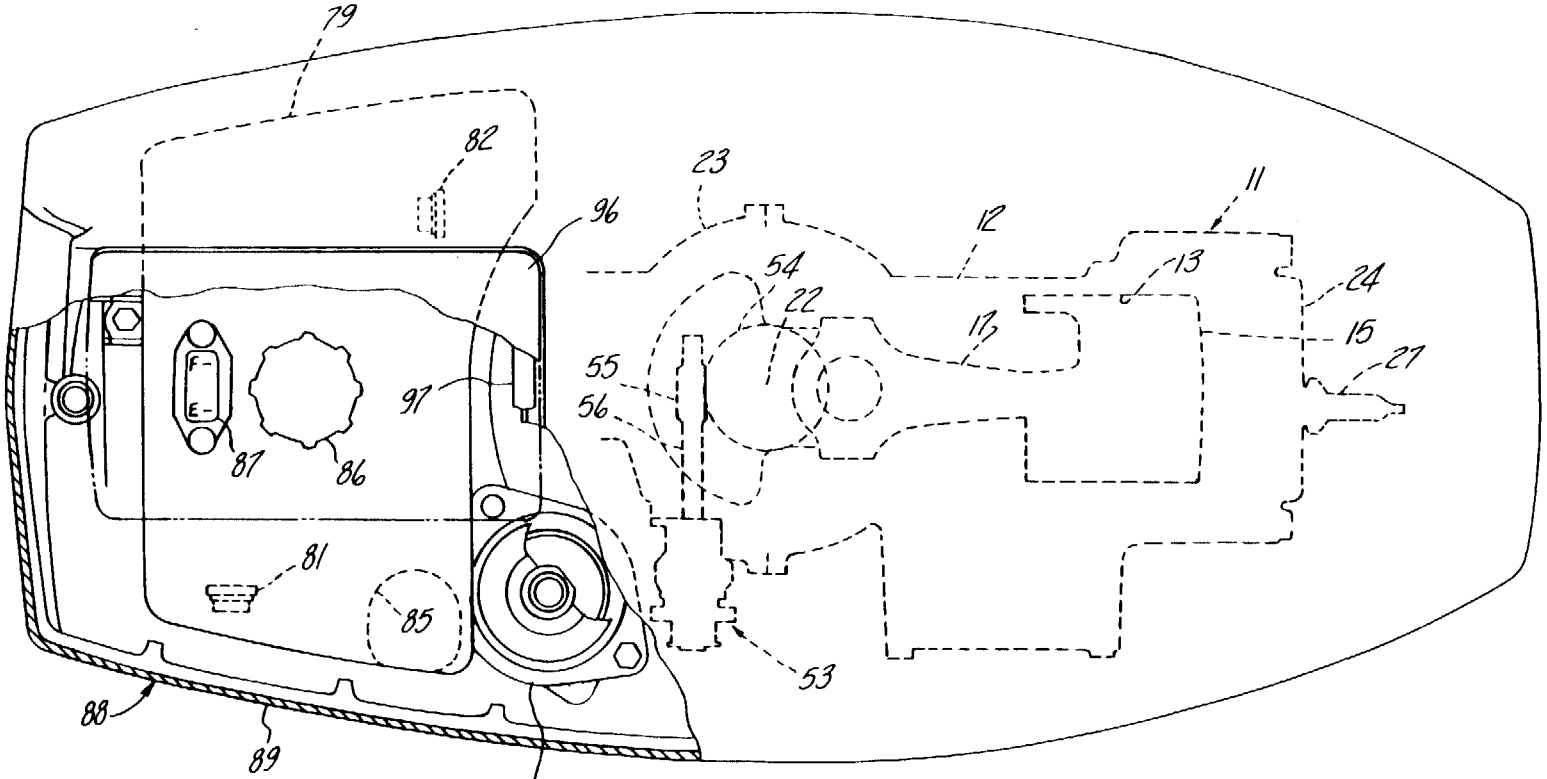
FIG. 3 is a top plan view of the engine with still further portions broken away.
Figure 4:
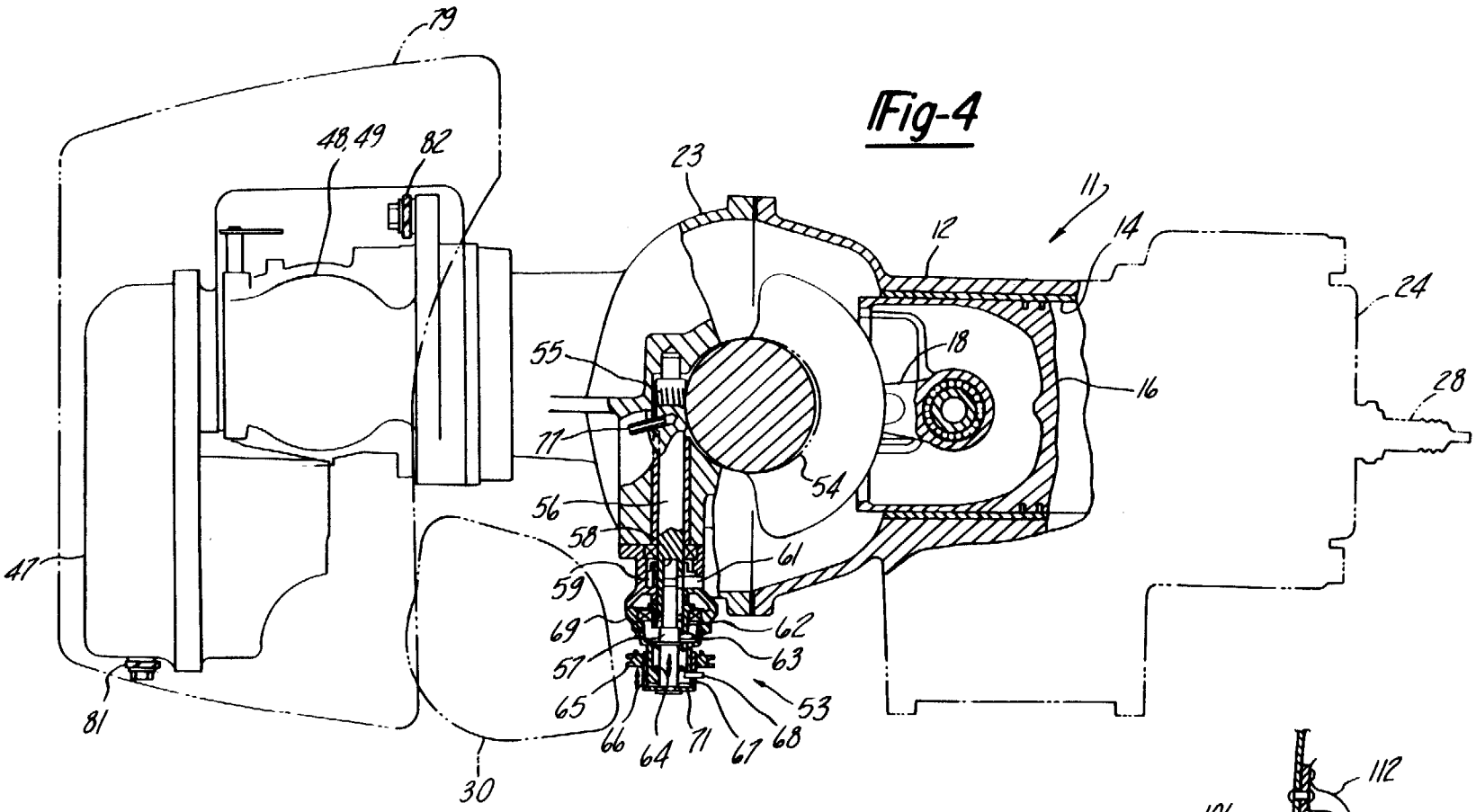
FIG. 4 is a further top plan view of the engine with a portion of the engine shown in section, this sectional portion being taken along the line 4—4 of FIG. 2.
Figure 5:
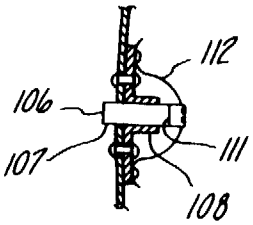
FIG. 5 is a cross-sectional view taken along the line 5—5 of FIG. 2.

The lubricating system for the engine 11 includes an oil pump, indicated generally by the reference numeral 53 (FIGS. 3 and 4). The oil pump 53 is driven by means of an oil pump drive gear 54 which is formed integrally with the crankshaft 22 immediately adjacent the lowermost side of the labyrinth seal 43. The crankshaft oil pump drive gear 54 is [o] *of* the helical or worm-type and drives a cooperating oil pump gear 55 that is affixed to an oil pump drive shaft 56 in any known manner.

The oil pump 53 is of the reciprocating plunger type and includes a plunger 57 that is slideably supported in a bore 58 formed at the outer end of the oil pump driveshaft 56. An oil inlet chamber 59 and oil outlet chamber 61 are in respective communication with the bore 58 so as to move oil from a sump to be described to the engine as the plunger 57 reciprocates.

A cam 62 has a helical face and is affixed for rotation with the driveshaft 56. The cam 62 engages a pin 63 that is affixed to the plunger 57 for reciprocating the plunger 57 in opposition to the action of a return spring 64. As is well known with this type of pump, rotation of the driveshaft 56 will cause the plunger 57 to [reciprocates] *reciprocate* due to the action of the cam 62 and pin 63.

The amount of discharge of the pump 53 is controlled by adjusting the stroke of the plunger 57. For this purpose, a pulley 65 is affixed to a sleeve 66. The sleeve 66 is formed with a helical groove 67 which receives a pin 68 that is, in turn, staked to a housing 69 formed at the lower end of the pump assembly 53. A disk 71 is affixed to the lower end of the plunger 57 and contacts the out end of the sleeve 66 so as to limit the degree of return movement of the plunger 57 toward the cam 62. Rotation of the pulley 65 causes the sleeve 66 to move axially due to the cooperation of the pin 68 and slot 67.

The lubricating system is designed in such a way that oil is fed under pressure from the pump 53 to the upper needle bearing assembly 35 and to the oil pump drive gears 54 and 55 under pressure. Lubrication of the remaining components including the needle bearing 36, roller bearing 37 and rod bearings and piston pins and the like is accomplished by gravity flow and splash. In this arrangement it is possible to maintain an extremely compact arrangement and nevertheless employ a [postive] *positive* pump for supplying pressurized oil to certain components of the engine.

To lubricate the upper needle bearing 35, the discharge port 61 of the oil pump 53 communicates with an oil passage, indicated in part schematically by the dot-dash line 72 which terminates in an oil delivery passage 73 formed in the crankcase 23 which terminates at the bearing 35. Oil which [flown] *flows* past the bearing 35 will be discharged to the cheeks of [thee crankshft] *the crankshaft* throw 19 so as to lubricate the rod bearing at the base of the connecting rod 17 and also the journal at the piston pin between the rod 17 and the piston 15. The oil will then flow down the crankshaft to the center main bearing portion 33 of the crankshaft so as to lubricate the center main bearing 36. The lubricating oil will then be discharged through a discharge port 74 in the cylinder block 12 adjacent the transfer or scavenge passage inlet 45. This oil is then mixed with the charge being transferred to the combustion chamber 25 so as to lubricate the upper portions of the engine. The excess oil will be burned during the combustion process and exhausted.

A further oil discharge passage 75 may be provided that extends from the lower end of the bearing 36 directly into the transfer passage 45. The passage 75 is positioned just upstream of the the labyrinth seal 43.

The oil pump 53 has a second discharge conduit, indicated in part schematically at 76, which extends from the pressure discharge port 61 for lubricating the pump drive gears 54 and 55 and the mechanism associated with the lower cylinder bore 14. The conduit 76 terminates in a pressure port 77 that communicates directly with the pump drive gear 55 so as to lubricate this gear and the driving gear 54. Oil which has lubricated the pump driving gears 54 and 55 will flow down the cheeks of the crankshaft throw 21 so as to lubricate the upper and lower bearings of the connecting rod 18. This oil will be discharged downwardly from the lowermost cheek of the throw 21 for delivery to the lower crankshaft bearing 37. The excess oil will be transferred from the bearing 37 to the transfer or scavenge port 46 via a discharge port 78 that is formed in the cylinder block 12 at the lower end of the bearing 37 and in communication directly with the transfer or scavenge port 46. This oil will be mixed with the intake charge and delivered to the upper portion of the cylinder bore 14 for lubricating the uppermost components associated with this cylinder. As with the cylinder bore 13, the excess oil will be burned and discharged through the exhaust port.

An oil tank or sump, indicated generally by the reference numeral 79 is provided for supplying a [souce] *source* of oil to the pump 53. As will become apparent, the oil tank 79 is constructed in such a way that it may be conveniently concealed within the cowling of the engine 11 and yet may be conveniently refilled without necessitating removal of the cowling. The oil tank 79 is provided with a pair of depending lugs 81 and 82 which are apertured so that the tank 79 may be supported by the air intake and silencer 47 and crankcase 23 in a suitable manner, including the use of bolts 83 and 84. The oil tank 79 is positioned so that its lower surface is above the uppermost surface of the bearing 35 to insure a ready supply of oil to the pump 53 regardless of abrupt maneuvering of the associated boat. The oil tank 79 has a depressed well portion 85 at the end adjacent to the crankcase 23 and a conduit 86 extends from this well portion to the pump inlet cavity 59. In this way a ready and continuous supply of oil can be supplied from the tank 79 to the oil pump 53.

The oil tank 79 is provided with a fill opening which is closed by a cap 86. In addition, an oil level [guage] *gauge*, indicated generally by the reference numeral 87, is provided in the upper wall of the tank 79. The power head of the engine 11 including the oil tank 79 is concealed within a protective cowling, indicated generally by the reference numeral 88. The cowling 88 [including] *includes* an upper cover 89 and a lower tray 91. The upper cover 89 is [detachable] *detachably* affixed to the tray 91 by means of a pair of releasable latches 92 and 93. The latches 92 and 93 may be of any known type and include a rotatable keeper 94 that is operated by the latch and which cooperates with a fixed keeper 95 affixed in any suitable manner to the lower tray 91.

In order to permit ready access to the oil tank 79 so as to fill it by removal of the cap 86 and to check the oil level by viewing the [guage] *gauge* 87 without necessitating removal of the cowling, an oil supply cover, indicated generally by the reference numeral 96, is provided. The oil supply cover 96 spans an opening that is formed in the upper cover 89 in proximity to the oil tank 79 and specifically to the cap 86 and gauge 87. This opening is defined by a flange of the cover 89 that receives a gasket 97 so as to sealingly engage the cover 96 when it is closed.

Figure 2:
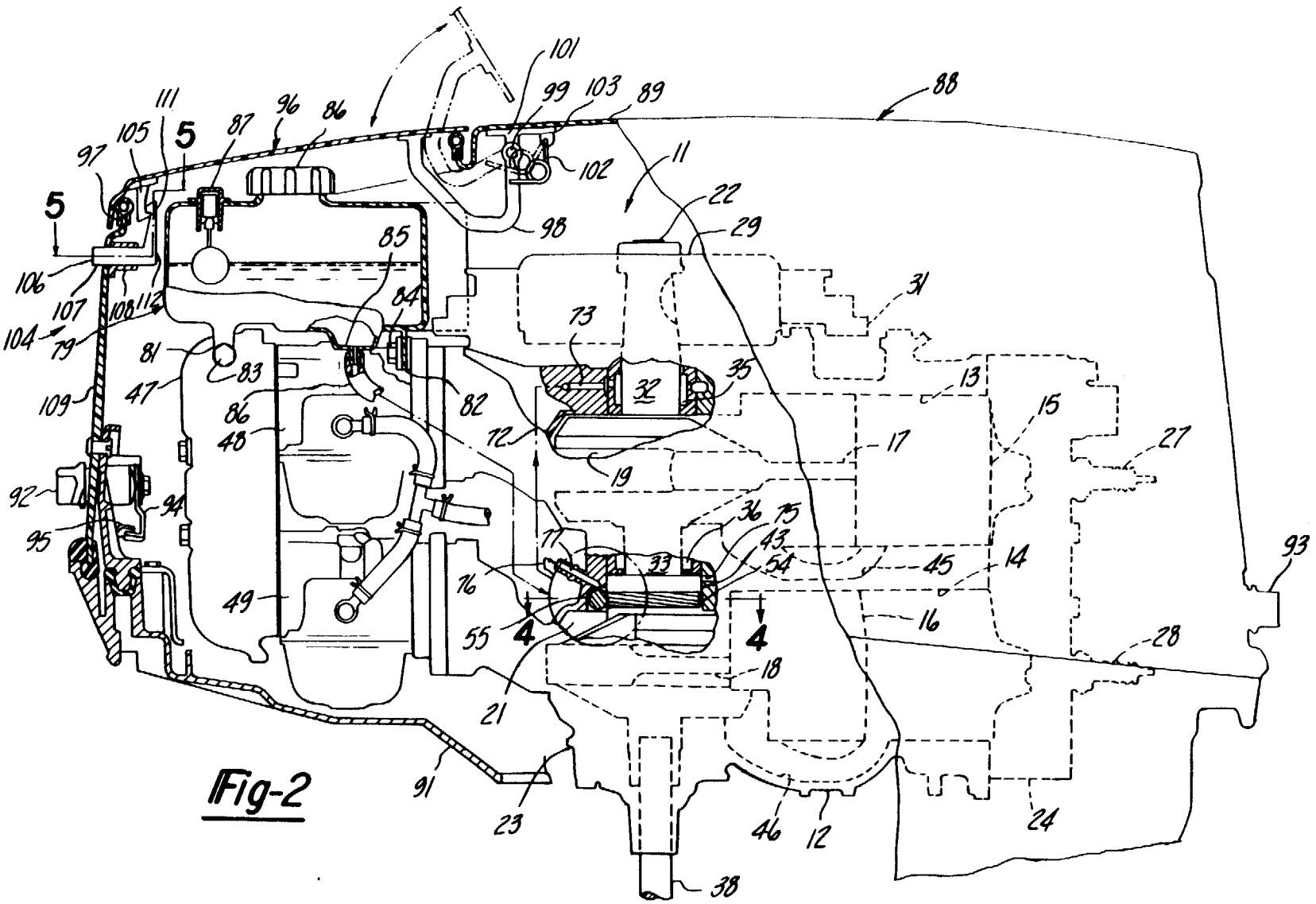
FIG. 2 is a side elevational view, in part similar to FIG. 1, showing the cowling in solid lines with portions broken away to indicate other components of the engine.

Affixed to the cover 96 is one or more "U" shaped arms 98 that is connected by means of a pivot pin 99 to a bracket 101 that is affixed to the upper cover 89 contiguous to the opening. The oil supply cover 96 is pivotal between a closed position as shown in FIG. 2 and an open position as shown in the broken line view of this figure. A torsional [spriing] *spring* 102 operates between the arm 98 and a lug 103 formed on the bracket 101 so as to bias the cover 96 to its opened position.

The oil supply cover 96 is retained in its closed position by means of a latch mechanism, indicated generally by the reference numeral 104. The latch mechanism consists of a fixed keeper 105 that is affixed to the cover 96 adjacent its rear end. A locking member 106 has a cylindrical portion 107 that is slideably supported in a bushing 108 that is affixed to a rear wall 109 of the upper cover 89. An upstanding hook shaped member 111 is integrally formed with the latch 106 and is adapted to co-act with the keeper 105 to latch the cover 96 in its closed position. A strap-type spring 112 is affixed to the bushing member 108 and engages the rear end of the latch 106 so as to normally bias it to its latched position as shown in FIG. 2. In order to open the oil supply cover 96 so as to replenish the oil supply or view the oil level [guage] *gauge* 87, the latch 106 is pressed inwardly so as to clear the keeper 105 and permit the cover 96 to pivot to its opened position under the action of the spring 102. Once the latch 106 is released, the spring 112 will return the latch 106 to its normally latched position. Closure of the oil supply cover 96 will cause the spring 112 to yield and effect relatching between the keeper 105 and the latch element portion 111.

The oil tank 79 has been described as being supported by the air silencer 47 and crankcase 23. It is to be understood that it may be supported in any other manner within the cowling 89 so long as it is positioned adjacent the upper end to permit convenient and rapid access to the tank.

From the foregoing description it should be readily apparent that an extremely compact arrangement has been provided wherein the oil reservoir may be conveniently concealed within the cowling of the engine and yet is readily accessible. Also the location of the oil pump and the arrangement of the lubricating system permits the maintenance of a short crankshaft without sacrificing engine lubrication. Although the invention has been described in conjunction with a two-cylinder engine, it should be readily apparent that it can be used in conjunction with engines having any multiple number of cylinders or with single cylinder engines insofar as the oil supply is provided. Various other changes and modifications may be made without departing from the spirit and scope of the invention as defined by the appended claims.

I claim:

1. In a lubricating system for a two-cycle, crankcase compression internal combustion engine having a cylinder block, a cylinder head affixed to said cylinder block, a crankshaft supported for rotation within a crankcase affixed to said cylinder block about a vertically extending axis by at least vertically spaced upper bearing means and lower bearing means, the improvement comprising an oil supply tank mounted externally of said cylinder head, cylinder block and crankcase, oil pump means supported externally of said cylinder head, cylinder block and crankcase and driven directly by said crankshaft, means for delivering oil from said external oil supply tank to said oil pump means and conduit means extending from said oil pump means to at least said upper bearing means for positively lubricating said upper bearing means.

2. A lubricating system as set forth in claim 1, wherein the upper bearing means and the lower bearing means journal the crankshaft by means of spaced main bearing portions separated by a throw, and means for providing for oil communication from the upper main bearing means to the crankshaft throw for lubricating said throw from oil return from said upper main bearing means.

3. A lubricating system as set forth in claim 1, wherein the cylinder block has a pair of cylinders one positioned above the other and the crankcase has separate sealed crankcase portions associated with each of said cylinders, said upper bearing means being associated with the [upermost] *uppermost* of said sealed crankcase portions, said oil pump means being driven within the lowermost of said crankcase chambers.

4. A lubricating system as set forth in claim 3, wherein the upper bearing means and the lower bearing means journal the crankshaft by means of spaced main bearing portions separated by a throw, and means for providing for oil communication from the upper main bearing means to the crankshaft throw for lubricating said throw from oil return from said upper main bearing means.

5. A lubricating system as set forth in claim 3, wherein the engine is contained within an outer cowling and comprises the power unit of an outboard motor and wherein the external oil supply tank is supported within said cowling for supplying oil to said oil pump.

6. A lubricating system as set forth in claim 5, further including means in the cowling for permitting replenishing of oil in the oil tank without requiring removal of the cowling.

7. A lubricating system as set forth in claim 6, wherein the tank is supplied with a removable fill cap and the means for permitting replenishing comprises an access door in the cowling that permits access to the fill cap.

8. A lubricating system as set forth in claim 7, wherein the fill cap is on the top of the tank and the access door is in the uppermost portion of the cowling.

9. A lubricating system as set forth in claim 8, wherein the access door is pivotally supported by the cowling for movement between an open position and a closed position.

10. A lubricating system as set forth in claim 1 wherein the oil pump means includes an oil pump drive shaft driven by the crankshaft and extending at right angles to *a plane containing* the crankshaft rotational axis and to the axis of the associated cylinder bore.

11. A lubricating system as set forth in claim 10 wherein the cylinder block has a plurality of cylinders and the oil pump drive shaft is disposed between the lowermost cylinder and the cylinders lying above it.

12. In a lubricating system for a two-cycle, crankcase compression internal combustion engine having a cylinder block, a cylinder head affixed to said cylinder block, a crankshaft supported for rotation about a vertically extending axis within a crankcase affixed to said cylinder block, a cylinder bore formed in said cylinder block and extending substantially perpendicularly to said vertically extending axis, a piston reciprocally supported in said cylinder bore, and connecting rod means operatively connecting said piston to said crankshaft for driving said crankshaft, the improvement comprising an oil pump positioned externally of said crankcase and said cylinder block for lubricating portions of said engine, said oil pump having a drive shaft extending perpendicularly to *a plane containing* said crankshaft axis and to said cylinder bore axis and driven by said crankshaft.

13. A lubricating system as set forth in claim 12 wherein the cylinder block has a plurality of cylinder bores having their axes spaced vertically from each other and extending horizontally and pistons each connected to the crankshaft by connecting rods.

14. A lubricating system as set forth in claim 13 wherein the oil pump drive shaft is disposed on the upper side of the lowermost connecting rod.

15. A lubricating system as set forth in claim 12 wherein the means for driving the oil pump drive shaft comprises a gear affixed to said oil pump drive shaft and enmeshed with a gear affixed to the crankshaft.

16. In a lubricating system for a two-cycle outboard motor having an engine and a surrounding cowling adapted to be carried at the upper end of a drive shaft housing, the improvement comprising an oil supply tank separate from said engine supported within said cowling above said drive shaft housing for supplying oil to the engine lubricating system and means in said cowling for permitting replenishment of the oil in said oil tank without requiring or removing said cowling.

17. An outboard motor as set forth in claim 16 wherein the means for permitting the replenishing of the oil tank includes an access door in the cowling.

18. An outboard motor as set forth in claim 17 wherein the tank is positioned at least in part above the engine and is supplied with a removable fill cap and the access door permits access to the fill cap.

19. An outboard motor as set forth in claim 18 wherein the fill cap is on the top of the tank and the access door is in the uppermost portion of the cowling.

20. An outboard motor as set forth in claim 19 wherein the access door is pivotally supported by the cowling for movement between an open position and a closed position.

*21. In a lubricating system for a two-cycle, crankcase compression internal combustion engine having a cylinder block, a cylinder head affixed to said cylinder block, a crankshaft supported for rotation about a vertically extending axis within a crankcase affixed to said cylinder block, a cylinder bore formed in said cylinder block and extending substantially perpendicularly to said vertically extending axis, a piston reciprocally supported in said cylinder bore, and connecting rod means operatively connecting said piston to said crankshaft for driving said crankshaft, the improvement comprising an oil pump positioned externally of said crankcase and said cylinder block for lubricating portions of said engine, said oil pump having a drive shaft extending perpendicularly to a plane containing said crankshaft axis and driven by said crankshaft and means for delivering oil to said engine for its lubrication.*

*22. A lubricating system as set forth in claim 21 wherein the cylinder block has a plurality of cylinder bores having their axes spaced vertically from each other and extending horizontally and pistons each connected to the crankshaft by connecting rods.*

*23. A lubricating system as set forth in claim 22 wherein the oil pump drive shaft is disposed above the lowermost connecting rod.*

*24. A lubricating system as set forth in claim 21 wherein the means for driving the oil pump drive shaft comprises a gear affixed to said oil pump drive shaft and enmeshed with a gear affixed to the crankshaft.*

*25. In a lubricating system for a two-cycle crankcase compression internal combustion engine having a cylinder block, a cylinder head affixed to said cylinder block, a crankshaft supported for rotation within a crankcase affixed to said cylinder block about a vertically extending axis by at least vertically spaced upper bearing means and lower bearing means, the improvement comprising an oil supply tank mounted externally of said cylinder head, cylinder block and crankcase, oil pump means supported externally of said cylinder head, cylinder block, oil supply tank and crankcase and driven directly by said crankshaft by a gear affixed for rotation to said crankshaft and an intermeshing gear affixed to a drive shaft of said oil pump means, means for delivering oil from said external oil supply tank to said oil pump means and conduit means extending from said oil pump means to deliver oil to said engine for its lubrication.*

*26. In a lubricating system as set forth in claim 25 wherein the engine is contained within an outer cowling and comprises the power unit of an outboard motor and wherein the external oil supply tank is supported within said cowling for supplying oil to said oil pump.*

*27. In a lubricating system as set forth in claim 26 further including means in the cowling for permitting replenishing of oil in the oil tank without requiring removal of the cowling.*

*28. In a lubricating system as set forth in claim 27 wherein the tank is supplied with a removable fill cap and the means for permitting replenishing comprises an access door in the cowling that permits access to the fill cap.*

*29. In a lubricating system as set forth in claim 28 wherein the fill cap is on the top of the tank and the access door is in the uppermost portion of the cowling.*

*30. In a lubricating system as set forth in claim 29 wherein the access door is pivotally supported by the cowling for movement between an open position and a closed position.*

* * * * *